June 2, 1931.  M. H. RICE  1,808,254
BALANCED VALVE
Filed Aug. 2, 1930
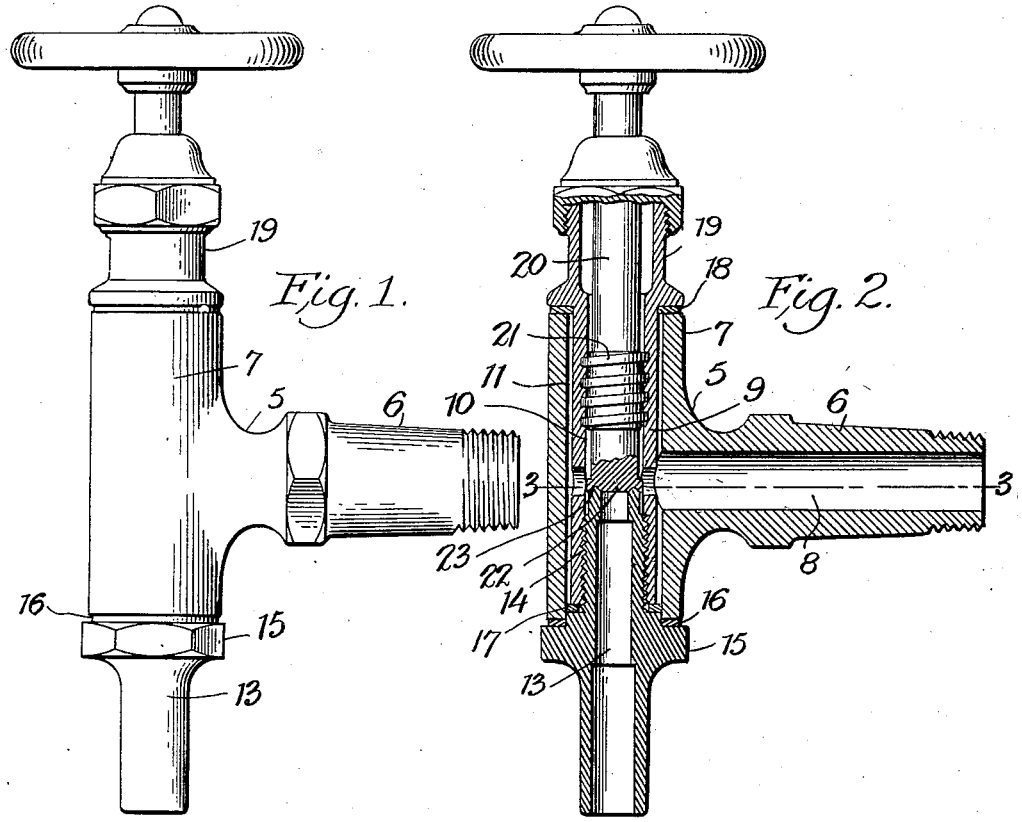
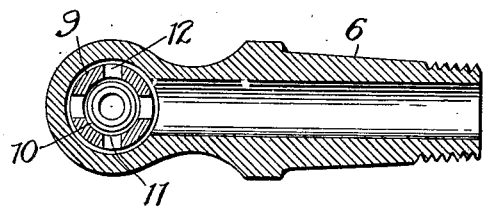
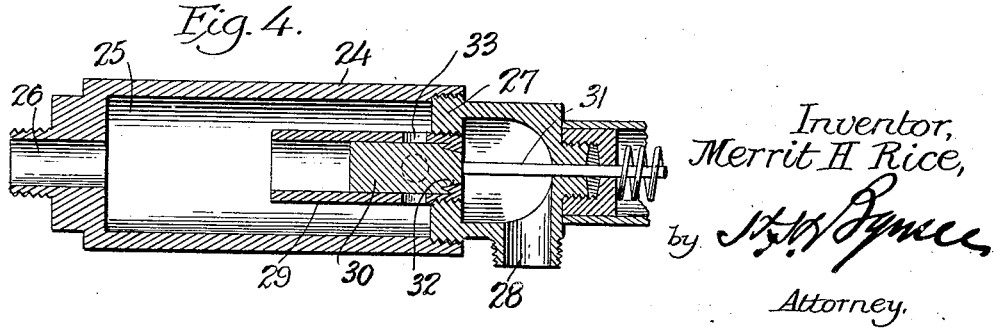
Inventor,
Merrit H. Rice,
by
Attorney.

Patented June 2, 1931

1,808,254

UNITED STATES PATENT OFFICE

MERRIT H. RICE, OF PASADENA, CALIFORNIA

BALANCED VALVE

Application filed August 2, 1930. Serial No. 472,657.

The present invention relates to balanced valves and consists in the combinations and arrangements of elements hereinafter described and particularly set forth in the accompanying claims.

The invention has for its purpose to provide a balanced and silently operating valve which is adapted to close in the direction of water flow, or other pressure medium, as distinct from against such flow, and one wherein the closing or seating of the valve under this pressure eliminates the use of all soft or composition washers which become defective and consequently cause leakage.

It is a further purpose of the invention to provide a balanced valve of this type, of all metal construction, and the several parts of which when assembled provide a compact and unitary article of attractive appearance.

The construction disclosed herein forms, in part, a continuation of the subject matter contained in my co-pending application for U. S. Patent, Serial No. 387,663, filed August 22, 1929, entitled "Balanced valve".

The invention is shown by way of illustration in the accompanying drawings, wherein:

Figure 1 is a side elevational view of the valve.

Figure 2 is a longitudinal sectional view thereof.

Figure 3 a horizontal sectional view taken on the line 3—3 of Figure 2, and;

Figure 4 is a longitudinal sectional view showing another adaptation of the valve.

Referring to the construction in further detail and wherein like reference characters designate corresponding parts in the different figures, the balanced valve consists of a casing 5 provided with a water inlet and fixture securing portion 6, and a cylindrical portion 7 having open ends. Said portion 7 extends for equal distances to either side of the water intake passageway 8 and is straight, as distinct from spherical or curved. In its entirety the valve presents a neat and unitary structure as shown in Figure 1.

A sleeve 9 fits within the cylindrical portion 7 and provides therewith an inner and an outer chamber 10 and 11 respectively which communicate with each other through the several apertures (See Figures 2 and 3). And an outlet pipe section 13 has screw-threaded connection 14 with the lower end of the sleeve 9. Said pipe member is formed with an integral nut portion 15 for adjustably securing the same to the member 9 and suitable washers 16 and 17 are interposed between the portion 13 and the cylinder 7 and sleeve 9 respectively. In like manner a washer 18 is provided for the upper end 19 of the fitting.

A valve control comprising a turning plug 20 has screw-threaded bearing 21 on the inner portion of the sleeve 9 for seating and unseating the valve end 22 which cooperates with the fixed valve seat 23 formed on the upper terminal edge of the outlet pipe section 13. Said valve seat 23 is formed with an annular ridge that co-acts with a complementary portion or groove in the end face of the turning plug 20 thereby providing a secure and non-leaking closure.

The inner and outer chambers 10 and 11 are constantly in communication with the water inlet 8, or other source of fluid supply, and through this constancy of pressure the valve 22 is always kept balanced on its seat. Thus with this construction there is effectively prevented any likelihood of pounding, leakage, or unseating of the valve which characterizes those types wherein the valve moves to its seat or closing position in a direction contra to that of the pressure supply.

In the construction shown in Figure 4 the device consists of a cylinder 24 providing a receiving chamber 25 having an inlet port 26 adapted to communicate with any suitable source of supply, and a closure head 27 having an outlet 28. A tubular and open-ended member 29 has a screw-threaded connection with the head piece 27 and provides the working space and suitable bearing for the piston valve 30 which is normally held seated and against rattling by the pressure of fluid supply. The valve connects by the rod 31 with a valve controlling and regulating means disclosed in detail in my co-pending application for U. S. Patent above identified.

The piston valve 30 is formed with an annular grooved portion 32 that co-acts with a complementary formed portion in the end of the cylinder 29 for the same purpose as that explained above respecting the valve portions 22 and 23. In like manner the cylindrical portion 29 is provided with a series of apertures 33 whereby the pressure source constantly acts on the valve and holds the same in a balanced position whether seated or unseated.

It is obvious that those skilled in the art may vary the details of construction and arrangement of parts without departing from the spirit of my invention, and therefore I do not wish to be limited to such features except as required by the claims.

What is claimed as new is:

1. A balanced valve comprising a casing, an apertured sleeve within the casing providing inner and outer communicating chambers, said chambers having portions extending in opposite directions from the valve inlet passageway; and a valve and valve seat located within said inner chamber, substantially as set forth.

2. A balanced valve comprising a casing, an apertured sleeve within the casing, providing inner and outer communicating chambers, said chambers having portions disposed equal distances on opposite sides of the valve inlet passageway; and a valve and valve seat located within said inner chamber, substantially as set forth.

3. A balanced valve comprising a pressure chamber having inlet and outlet passages, a cylinder in said chamber having a valve seat, and a valve, said cylinder constructed to admit pressure for seating and balancing the valve, substantially as set forth.

4. A balanced valve comprising a pressure chamber having inlet and outlet passages, an open-ended cylinder in said chamber having a valve seat, and a valve operable to seat under the pressure in said cylinder, said cylinder having lateral openings for pressure balancing the valve, substantially as set forth.

5. A balanced valve comprising a casing providing a pressure chamber, a cylinder portion located in said chamber having a non-pliable valve seat, and a valve having a non-pliable portion to engage the seat, said cylinder constructed to admit pressure for seating and balancing the valve, substantially as set forth.

6. An all metal valve construction comprising a cylinder providing a valve seat having an annular grooved portion, and a piston valve member having an annular and complementary seat engaging portion, substantially as set forth.

7. A balanced valve comprising an open ended casing, an apertured sleeve fitting therein and co-extensive therewith, said sleeve being spaced from the casing and therewith providing outer and inner communicating chambers, and a valve member and valve seat located in said inner chamber, substantially as set forth.

8. A balanced valve comprising an open ended casing, having an inlet, an apertured sleeve closing one end of said casing and fitting therein and providing outer and inner communicating chambers, an outlet pipe having screw-threaded connection with the sleeve and closing one end of said chambers respectively, said outlet pipe providing a valve seat; and a valve member for said seat, substantially as set forth.

9. A balanced valve comprising a casing, having an inlet, an apertured sleeve within the casing communicating with the inlet of the casing and providing outer and inner communicating chambers, an outlet pipe securing the sleeve within the valve casing and providing a valve seat immediately adjacent the apertures therein, and a seating valve member screw-threaded in the sleeve, substantially as set forth.

10. An all metal balanced valve construction comprising a casing, a tubular seat member mounted centrally in the casing and spaced therefrom and terminating within the casing, and providing with the casing an annular chamber, a plurality of apertures adjacent the seat, and a reciprocable valve member adapted to be balanced by the liquid pressure through said apertures, substantially as set forth.

In witness whereof, I have hereunto set my hand at Washington, District of Columbia, this twelfth day of May, A. D. nineteen hundred and thirty.

MERRIT H. RICE.